(12) United States Patent
Li et al.

(10) Patent No.: US 12,284,458 B2
(45) Date of Patent: Apr. 22, 2025

(54) PROCESSING DEVICE, SYSTEM AND METHOD FOR BOARD WRITING DISPLAY

(71) Applicant: Beijing ESWIN Computing Technology Co., Ltd., Beijing (CN)

(72) Inventors: Weiqi Li, Beijing (CN); Gaosheng Wang, Beijing (CN); Nan Jing, Beijing (CN); Yuandong Huang, Beijing (CN); Andy Zhou, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 256 days.

(21) Appl. No.: 18/164,648

(22) Filed: Feb. 6, 2023

(65) Prior Publication Data

US 2023/0353702 A1 Nov. 2, 2023

(30) Foreign Application Priority Data

Apr. 29, 2022 (CN) .......................... 202210471921.0

(51) Int. Cl.
*H04N 5/272* (2006.01)
*G06T 5/70* (2024.01)
*G06T 7/11* (2017.01)

(52) U.S. Cl.
CPC ............... *H04N 5/272* (2013.01); *G06T 5/70* (2024.01); *G06T 7/11* (2017.01); *G06T 2207/10016* (2013.01)

(58) Field of Classification Search
CPC .. H04N 5/272; G06T 5/70; G06T 7/11; G06T 2207/10016; G06T 5/50;
(Continued)

(56) References Cited

U.S. PATENT DOCUMENTS

2020/0301644 A1* 9/2020 Conny ................ G06F 3/04883
2022/0121354 A1* 4/2022 Xia ..................... G06F 3/04847
(Continued)

FOREIGN PATENT DOCUMENTS

| CN | 114202601 A | 3/2022 |
| CN | 114860184 A | 8/2022 |
| CN | 114945107 A | 8/2022 |

*Primary Examiner* — Kyu Chae
(74) *Attorney, Agent, or Firm* — Westman, Champlin & Koehler, P.A.

(57) ABSTRACT

Disclosed is a processing device, a system, a method for board writing display. The processing device comprises: an extraction unit to extract a first board-writing image from a first image frame in a video and a second board-writing image from a second image frame in the video; a supplement unit to determine an occlusion area of the second board-writing image based on a target object segmentation image of the second image frame, and replace the occlusion area of the second board-writing image with a corresponding area of the first board-writing image to obtain a third board-writing image; an output unit to generate an output image frame based on the second image frame and the third board-writing image, the output image frame presents an image with a target object located behind a transparentized board writing content. The present disclosure enables the board-writing data in the video to be presented completely.

11 Claims, 8 Drawing Sheets

(58) Field of Classification Search
CPC . G06T 2207/10024; G06T 2207/20081; G06T 2207/20084; G06F 3/14; G06F 3/147; G06N 3/04; G06N 3/08
See application file for complete search history.

(56) References Cited

U.S. PATENT DOCUMENTS

2022/0335620 A1* 10/2022 Ostap ........................ G06T 5/94
2024/0078007 A1* 3/2024 Nomura .............. G06F 3/04883

\* cited by examiner

PROCESSING DEVICE, SYSTEM AND METHOD FOR BOARD WRITING DISPLAY

CROSS-REFERENCE TO RELATED APPLICATIONS

The present application claims the priority of Chinese Patent Application No. 202210471921.0, filed on Apr. 29, 2022, entitled by "PROCESSING DEVICE, SYSTEM AND METHOD FOR BOARD WRITING DISPLAY", and published as CN114860184A on Aug. 5, 2022, which is incorporated herein by reference in its entirety.

FIELD OF TECHNOLOGY

The present disclosure relates to a technical field of video processing, in particular to a processing device, a system and a method for board writing display.

BACKGROUND

With the popularity and popularization of online education, a teaching video has become an indispensable type of educational resource. The teaching video is a video obtained by shooting a teaching scenario with a camera. In the teaching scenario, a teacher teaches by writing data on a writing board, and the board-writing data is very important for making the teaching video understood. However, in a case that the teacher occludes the writing board, the teaching video cannot present the board-writing data completely.

SUMMARY

In order to solve the above technical problems, the present disclosure provides a processing device, a system and a method for board writing display.

According to a first aspect of the present disclosure, a processing device for board writing display is provided, and comprises:
- an extraction unit, configured to extract a first board-writing image from a first image frame in a video and a second board-writing image from a second image frame in the video;
- a supplement unit, configured to determine an occlusion area of the second board-writing image based on a target object segmentation image of the second image frame, and replace the occlusion area of the second board-writing image with a corresponding area of the first board-writing image to obtain a third board-writing image;
- an output unit, configured to generate an output image frame based on the second image frame and the third board-writing image, wherein the output image frame presents an image with a target object located behind a transparentized board writing content;
- wherein, the first board-writing image is a board-writing image with complete board-writing data, and the second board-writing image is a board-writing image that needs to be supplemented with board-writing data due to the target object being occluded.

In some embodiments, the extraction unit is configured to extract a board-writing image of any image frame in the video by performing following steps, comprising:
- obtaining a target object segmentation image of said any image frame, wherein a contrast ratio between a target object and a background in the target object segmentation image of said any image frame reaches a predetermined contrast ratio;
- obtaining a grayscale image to be processed based on a grayscale image of said any image frame, according to a color board type of a writing board;
- performing an image operation on the target object segmentation image of said any image frame and the grayscale image to be processed to highlight board-writing data, and performing a binarization processing on an image obtained by performing the image operation to obtain the board-writing image of said any image frame.

In some embodiments, the extraction unit is configured to obtain the target object segmentation image of said any image frame by obtaining a matte image or a mask-code image of the target object in said any image frame.

In some embodiments, the extraction unit is further configured to determine the color board type of the writing board based on a pixel value distribution of the grayscale image of said any image frame in the video.

In some embodiments, the extraction unit is further configured to perform an edge smoothing and enhancement processing on a character in the image obtained by performing the binarization processing, and to determine the image obtained after performing the edge smoothing and enhancement processing as the board-writing image of said any image frame.

In some embodiments, said any image frame is divided into an area of the writing board and a peripheral area around the writing board;
- the extraction unit is further configured to crop the area of the writing board from said any image frame, obtain a target object segmentation image of the area of the writing board as the target object segmentation image of said any image frame, and obtain a grayscale image of the area of the writing board as the grayscale image of said any image frame which is a basis for obtaining the grayscale image to be processed.

In some embodiments, said any image frame has coordinate information of four vertices of the writing board in said any image frame, the extraction unit is further configured to crop the area of the writing board from said any image frame by performing following steps, comprising:
- determining the area of the writing board in said any image frame based on the coordinate information, and cropping out the determined area of the writing board.

In some embodiments, the output unit is configured to generate the output image frame by performing following steps, comprising:
- processing the third board-writing image to obtain a transparentized board image, according to a color board type of a writing board;
- superimposing the transparentized board-writing image on an area of the writing board in the second image frame.

In some embodiments, the supplement unit is configured to determine the occlusion area of the second board-writing image by performing following steps, comprising:
- obtaining a board-writing difference image based on a difference between the second board-writing image and the first board-writing image;
- determining a missing area of the second board-writing image in the board-writing difference image;
- determining the occlusion area of the second board-writing image in the missing area based on the target object segmentation image of the second image frame.

According to a second aspect of the present disclosure, a processing system for board writing display is provided, and comprises:
- a camera, configured to obtain a video;
- any processing device according to the first aspect of the present disclosure, electrically connected to the camera and configured to process the video;
- a display device, electrically connected to the processing device and configured to display the processed video.

According to a third aspect of the present disclosure, a processing method for board writing display is provided, wherein the processing method comprises:
- extracting a first board-writing image from a first image frame in a video and a second board-writing image from a second image frame in the video;
- determining an occlusion area of the second board-writing image based on a target object segmentation image of the second image frame, and replacing the occlusion area of the second board-writing image with a corresponding area of the first board-writing image to obtain a third board-writing image;
- generating an output image frame based on the second image frame and the third board-writing image, wherein the output image frame presents an image with a target object located behind a transparentized board writing content;
- wherein, the first board-writing image is a board-writing image with complete board-writing data, and the second board-writing image is a board-writing image that needs to be supplemented with board-writing data due to the target object being occluded.

The beneficial effects of the present disclosure are as follows:

A processing device for board writing display provided according to the present disclosure comprises an extraction unit, a supplement unit, and an output unit. Wherein, the extraction unit is configured to extract a first board-writing image from a first image frame in a video and a second board-writing image from a second image frame in the video; the supplement unit is configured to determine an occlusion area of the second board-writing image based on a target object segmentation image of the second image frame, and replace the occlusion area of the second board-writing image with a corresponding area of the first board-writing image to obtain a third board-writing image; the output unit is configured to generate an output image frame based on the second image frame and the third board-writing image, wherein the output image frame presents an image with a target object located behind a transparentized board writing content. Therefore, the board-writing data in the output image frame is completely presented in front of the target object, and a user who watches the video will not miss the board-writing data with the occlusion of the target object or other reasons, after the second image frame is replaced by the output image frame.

It should be noted that, the above general description and the following detailed description are only exemplary and explanatory, and not a limit to the present disclosure.

DESCRIPTION OF THE EMBODIMENTS

Figure 1A:
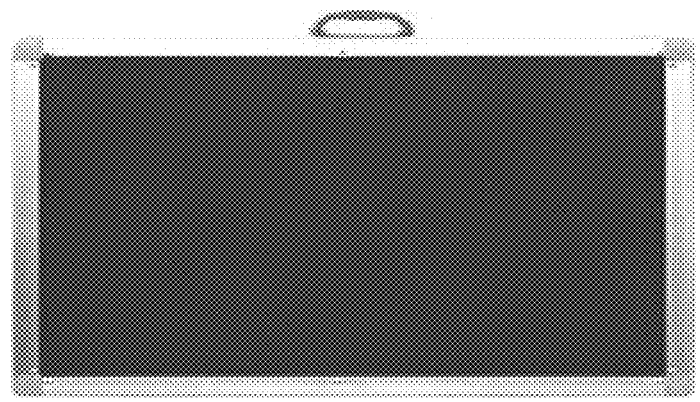
FIG. 1A, FIG. 1B and FIG. 1C show various states of a writing board in an image frame.

In order to facilitate an understanding of the present disclosure, a more comprehensive description of the present disclosure will be given below with reference to the related accompanying drawings. Preferred embodiments of the present disclosure are shown in the accompanying drawings. However, the present disclosure can be implemented in different forms and is not limited to the embodiments described herein. On the contrary, in order to make a more thorough and comprehensive understanding of the present disclosure, these embodiments are provided.

The following terms are used herein, comprising:
(1) A writing board, which is a board for writing content during board writing display, including but not limited to a black board, a green board, a blue board and a white board.
(2) Board-writing data, which is the content written on a writing board, including but not limited to a word, a symbol, a chart and other expression forms. Wherein, in the present disclosure, the expression forms of the board-writing data are collectively referred to as characters.
(3) A target object, which is a person or thing occluding board-writing data in each image frame in a video.
(4) A target object segmentation image, which is an image in which pixels of a target object and pixels of a non-target object have different pixel values.
(5) A grayscale image, which is an image represented by grayscales. Wherein, any non-grayscale image can be converted to a grayscale image. Specifically, since any color is composed of three primary colors of red, green, and blue, if an original color of a pixel is represented as (R, G, B) in RGB space, a grayscale value Gray of the pixel after converted into a grayscale image is a weighted sum of R, G, and B.

(6) A grayscale value, which is a value of a grayscale, generally ranging from 0 to 255, wherein the grayscale value of white is 255 and the grayscale value of black is 0.

(7) An image multiplication, which is a basic operation between two images requiring that the two images have the same pixel size. Wherein, the two images with the same pixel size are multiplied, that is, pixel values of corresponding pixels in the two images are multiplied.

(8) An image AND operation, which is a basic operation between two images requiring that the two images have the same pixel size and at least one of the two images is a binary image. Wherein, an AND operation is performed between an image and a binary image, that is, a pixel in the image corresponding to a black pixel in the binary image becomes a black pixel, and a pixel value of a pixel in the image corresponding to a white pixel in the binary image is unchanged.

(9) Binarization, which is to set pixel values of pixels in an image into two pixel values with large discrimination in the embodiments of the present disclosure. Wherein, for example, the two pixel values with large discrimination are a grayscale value 0 (that is, R=0, G=0, and B=0 in the three-channel image) and a grayscale value 255 (that is, R=255, G=255, and B=255 in the three-channel image), respectively. In this case, the entire image presents an obvious visual effect of only black and white.

(10) An image inversion operation, which makes a pixel with a pixel value of x in an image become a pixel with a pixel value of (255−x).

A video is obtained by shooting a scenario with a camera. In the present disclosure, there is a writing board in a scenario shot by a camera, and board-writing data on the writing board can be occluded by a target object so that the board-writing data may not be completely presented in the shot video. For example, in a teaching scenario, a teacher writes board-writing data on a writing board for teaching. If the teacher occludes the board-writing data at a certain time in the teaching process, the video obtained by shooting the teaching scenario will show that the board-writing data in a frame image is occluded by the teacher who is as a target object. Therefore, how to present board-writing data completely in a video has become a technical problem to be solved urgently.

In view of this, a processing device for board writing display is provided in the embodiments of the present disclosure, and a video processed by the processing device can completely present board-writing data. Since the construction of smart classrooms, the production of micro-classrooms, the recorded broadcast of normalized courses, and the recorded broadcast and live broadcast of open video courses involve a record of a teaching scenario, the processing device for board writing display provided in the present disclosure can be used in these fields.

Figure 1B:
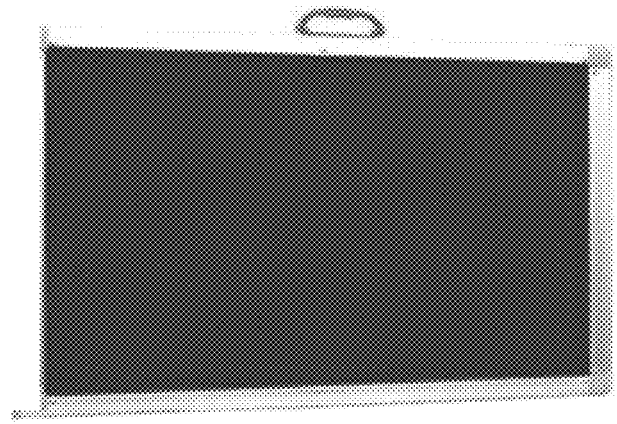
Figure 1C:
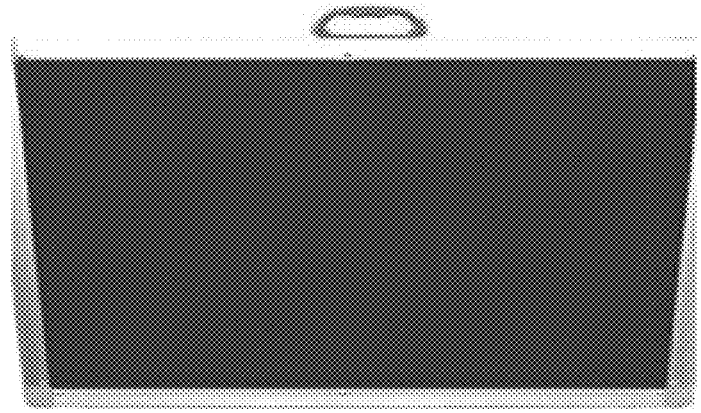

A video processed by the processing device in the embodiments of the present disclosure can be an original recorded video of a real scenario using a camera. Each image frame in the original recorded video shall be shot clearly so that board writing content in the image frame can be seen clearly. It should be noted that a writing board in the original recorded video can be upright as shown in FIG. 1A, or can have a certain tilt, for example, the writing board has a horizontal tilt shown in FIG. 1B, a vertical tilt shown in FIG. 1C, or a mixture of two tilt. For a video with a writing board having a certain tilt, it is necessary to uniformly correct each image frame in the video to the upright state shown in FIG. 1A in advance through an existing image correction operation. In this way, on the one hand, it is suitable for users to watch, on the other hand, it is convenient to replace board-writing images between different image frames in the future.

Figure 2:
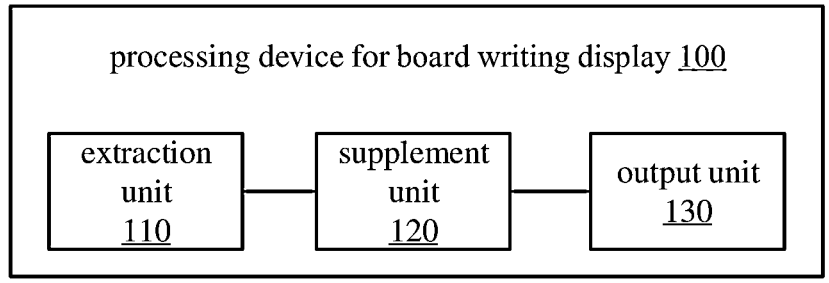
FIG. 2 shows a structural block view of a processing device for board writing display according to an embodiment of the present disclosure.

FIG. 2 shows a processing device for board writing display according to an embodiment of the present disclosure. Referring to FIG. 2, the processing device 100 for board display writing includes an extraction unit 110, a supplement unit 120 and an output unit 130.

The extraction unit 110 is configured to extract a first board-writing image from a first image frame in a video and a second board-writing image from a second image frame in the video. The first board-writing image is a board-writing image with complete board-writing data, and the second board-writing image is a board-writing image that needs to be supplemented with board-writing data due to a target object being occluded.

The supplement unit 120 is configured to determine an occlusion area of the second board-writing image based on a target object segmentation image of the second image frame, and replace the occlusion area of the second board-writing image with a corresponding area of the first board-writing image to obtain a third board-writing image.

The output unit 130 is configured to generate an output image frame based on the second image frame and the third board-writing image, wherein the output image frame presents an image with the target object located behind a transparentized board writing content.

Specifically, when the video is played, the output image frame is used to replace the second image frame for display.

It should be noted that the first image frame can be an image frame without a phenomenon that a target object occludes board-writing data, so that the first board-writing image including the complete board-writing data can be extracted form the first image frame without processed by the processing device 100; the first image frame can also be an image frame with a phenomenon that a target object occludes board-writing data, so that the first image frame needs to be processed by the processing device 100 to obtain a corresponding output image frame, and the first board-writing image including the complete board-writing data is extracted from the output image frame corresponding to the first image frame.

The first image frame is used to supplement the board-writing data in the second image frame, so the first image frame should be close to the second image frame, for example, the first image frame is a previous frame of the second image frame in the video. In practice, for a video, a first frame of the video can only be used as an initial frame, and the video is processed from a second frame to a last frame of the video, so that a demand for user to view the complete board-writing data can be basically satisfied when the video is played.

The above units included in the processing device 100 will be described in detail below.

Figure 3:
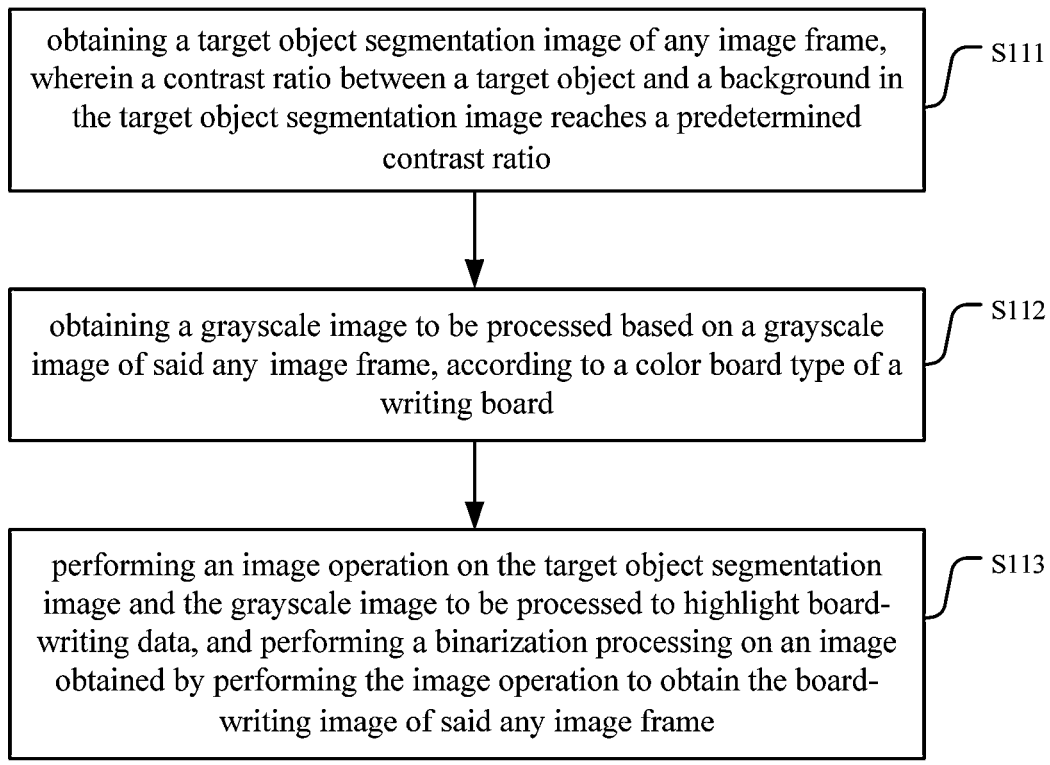
FIG. 3 shows a flowchart of a method performed by an extraction unit according to an embodiment of the present disclosure.

FIG. 3 shows a flowchart of the steps performed when the extraction unit 110 extracts a board-writing image of any image frame in a video. Referring to FIG. 3, the extraction unit 110 extracts a board-writing image of any image frame in a video by performing following steps, comprising:

Step S111, obtaining a target object segmentation image of said any image frame.

It should be noted that the target object segmentation image only distinguishes pixels of a target object and pixels of a non-target object in said any image frame through different pixel values, so a contrast ratio between the target object and a background in the target object segmentation image can reach a predetermined contrast ratio, and the target object segmentation image and said any image frame of the video have the same size. Wherein, when the target object is a teacher, the target object includes not only the teacher's body parts, but also the teacher's personal belongings, such as a chalk, a book or a microphone in the teacher's hands. Therefore, the above pixels of the target object include pixels of the teacher's body parts and pixels of the teacher's personal belongings.

Specifically, in an embodiment, in the target object segmentation image, the pixels of the target object have a first pixel value and the pixels of the background have a second pixel value, and the first pixel value and the second pixel value are located on both sides of a grayscale threshold value. That is, either the first pixel value is less than the grayscale threshold value and the second pixel value is greater than the grayscale threshold value, or the first pixel value is greater than the grayscale threshold value and the second pixel value is less than the grayscale threshold value.

It should be emphasized that, unless otherwise specified, in the embodiments of the present disclosure, for a color image with different pixel values in three channels of R (red), G (green), and B (blue), when its pixel values are compared with a value (such as, a grayscale threshold value), its pixel values are the pixel values of its grayscale image.

The grayscale threshold value can be selected as an intermediate value from 0 to 255, such as 127 or 128, so that the colors respectively corresponding to the first pixel value and the second pixel value can be distinguished into a commonly called dark color and a commonly called light color.

Further, it can also be that the color corresponding to the first pixel value is black and the color corresponding to the second pixel value is white, or the color corresponding to the first pixel value is white and the color corresponding to the second pixel value is black. In this example, the extraction unit 110 obtains a matte image or a mask-code image of the target object in said any image frame to obtain the target object segmentation image through an existing target object segmentation algorithm.

Figure 4A:
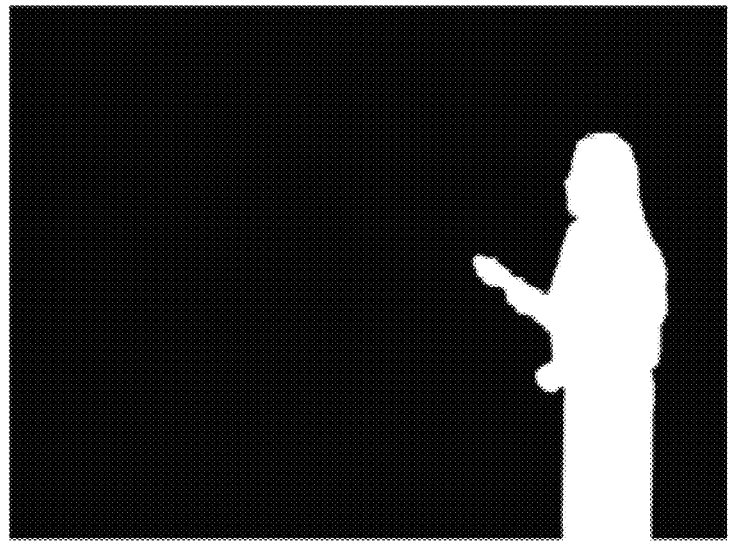
FIG. 4A shows an exemplary matte image or mask-code image of a target object according to an embodiment of the present disclosure.
Figure 4B:
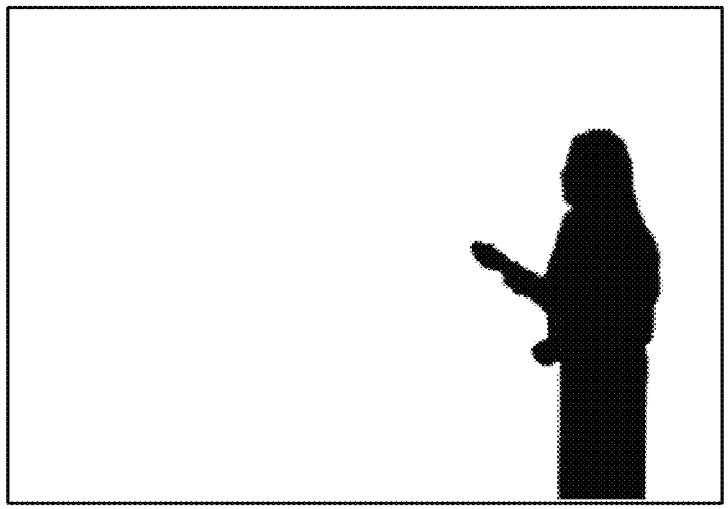
FIG. 4B shows an exemplary target object segmentation image according to an embodiment of the present disclosure.

Specifically, if the color corresponding to the first pixel value is black and the color corresponding to the second pixel value is white, the extraction unit 110 performs an image inversion operation on an obtained matte image or mask-code image to obtain the target object segmentation image of said any image frame, when the matte image or the mask-code image of the target object in said any image frame is obtained. For example, FIG. 4A shows a matte image or a mask-code image of a target object, and FIG. 4B shows a target object segmentation image obtained after the extraction unit 110 performs an image inversion operation on the image shown in FIG. 4A. And it should be noted that a black frame in FIG. 4B is an additional part added to identify the range of the target object segmentation image, but not a part of the target object segmentation image.

If the color corresponding to the first pixel value is white and the color corresponding to the second pixel value is black, the extraction unit 110 obtains the matte image or the mask-code image of the target object in said any image frame, that is, the target object segmentation image of said any image frame is obtained by the extraction unit 110.

The functions of the matte image and the mask-code image can be understood by referring to the prior art, and will not be described in detail herein. In the embodiments of the present disclosure, the matte image is as shown in FIG. 4A, that is, the target object as a concerned part is marked in white, while the non-target object is marked in black. The mask-code image is also as shown in FIG. 4A, that is, the target object as an unoccluded part is marked in white, while the non-target object as a part need to be occluded is marked in black.

The above-mentioned target object segmentation algorithm is mostly implemented using a neural network. The used neural network includes but is not limited to MODNet (motion and appearance based moving object detection network), U2Net (a network structure obtained by making improvement on U-net which is a U type neural network), SOLO (Segmenting Objects by Location), SOLOv2 (a network structure obtained by making improvement on SOLO), SINet, Extreme C3, HRNet_wl8_small_V1 (a network structure obtained by making improvement on HRNet, i.e., High-Resolution Net), Deeplabv3, deeplabv3p_xception65, ocrnet_hrnetwl8_voc (a full name of ocrnet is Object-Contextual Representations Net), BiSeNetV2 (a network structure obtained by making improvement on BiSeNet, and a full name of BiSeNet is Bilateral Segmentation Network) and UNet_MobileNetV2. It should be noted that the above-mentioned neural networks are directly named using all or part of the English word abbreviations. Those skilled in the art directly use these names to represent the corresponding existing neural networks which are not repeated herein.

In the context of the increasingly mature object segmentation algorithm, it is simple and fast to obtain a target object segmentation image using the above method, and the accuracy is also increased, so as to improve the accuracy of subsequent extracted board-writing data.

Step S112, obtaining a grayscale image to be processed based on a grayscale image of said any image frame, according to a color board type of a writing board.

It should be noted that, in practice, no matter what kind of color board type the writing board belongs to, a contrast ratio between the writing board and board-writing data in said any image frame containing the writing board may reach a predetermined contrast ratio, and a contrast ratio between the writing board and board-writing data in the grayscale image to be processed obtained based on the grayscale image of said any image frame may also reach a predetermined contrast ratio.

Specifically, it can be that the grayscale image to be processed is the grayscale image of said any image frame when the writing board is a first type of color board, and the grayscale image to be processed is a grayscale image obtained after performing an image inversion operation on the grayscale image of said any image frame, when the writing board is a second type of color board. Wherein, pixel values of a grayscale image of the first type of color board are close to pixel values of a target object in a grayscale image of the target object segmentation image, and pixel values of a grayscale image of the second type of color board are close to pixel values of a background in the grayscale image of the target object segmentation image.

In the case where, in the target object segmentation image, pixels of the target object have the first pixel value and pixels of the non-target object have the second pixel value, it can be that pixel values of the first type of color board and the first pixel value are located on the same side of the grayscale threshold value, and the pixel values of the first type of color board and pixel values of the second type of color board are located on both sides of the gray scale threshold value. That is, when the first pixel value is less than the grayscale threshold value and the second pixel value is greater than the grayscale threshold value, the pixel values of the first type of color board are less than the grayscale threshold value, and the pixel values of the second type of color board are greater than the grayscale threshold value; and when the first pixel value is greater than the grayscale threshold value and the second pixel value is less than the grayscale threshold value, the pixel values of the first type of color board are greater than the grayscale threshold value, and the pixel values of the second type of color board are less than the grayscale threshold value.

During the execution of this step, the extraction unit 110 needs to first determine the color board type of the writing board. The determination method can be that the color board type of the writing board is determined based on a pixel value distribution of the grayscale image of said any image frame. Even if the writing board has been written, there will still be a plurality of block-shaped areas of different sizes that are not covered by written content, so the color board type of the writing board can be determined based on pixel values of a grayscale image of any block-shaped area.

It is required that a change range of pixel values in the grayscale image of the block-shaped area does not exceed a first threshold value. For example, the first threshold value is a pixel value difference between the writing board and a matched writing pen, which is far greater than a change range of pixel values of color of the writing board under light. For example, the first threshold value is set to be 200. In this way, in the practice of using a black pen to write black content on a light color board and using a white pen to write white content on a dark color board, even if light makes pixel values of an area without written data on the writing board kept inconsistent, this method can ensure that the block-shaped area is an area without any written data.

In terms of shape, the block-shaped area may be a circular area distributed on the writing board with a diameter not less than a second threshold value, and may also be a rectangular area distributed on the writing board with a length and width not less than the second threshold value, and may also be an area, which is distributed on the writing board, without any writing content. The second threshold value herein can be determined according to a size of the writing board and a size of a character on the writing board. Specifically, the second threshold value can be set to be greater than the length of the character on the writing board and not greater than the width of the writing board.

After determining the required block-shaped area, the color board type of the writing board can be determined based on the pixel values of the grayscale image of the block-shaped area. For example, if optional color board types comprise the first type of color board and the second type of color board, whether the color board type of the writing board is the first type of color board or the second type of color board can be determined based on a relationship between an average value of all pixels of the grayscale image of the block-shaped area and the grayscale threshold value. When the grayscale threshold value is 127 or 128, the first type of color board and the second type of color board are a dark color board and a light color board, respectively. For example, a common dark color board comprises a black board and a green board, and a common light color board comprises a white board.

Step S113, performing an image operation on the target object segmentation image and the grayscale image to be processed to highlight board-writing data, and performing a binarization processing on an image obtained by performing the image operation to obtain the board-writing image of said any image frame.

Specifically, in the case where, in the target object segmentation image, the pixels of the target object have the first pixel value and the pixels of the background have the second pixel value, and optional color board types comprise the first type of color board and the second type of color board, the step to perform the image operation on the target object segmentation image and the grayscale image to be processed to highlight the board-writing data can be implemented by performing the image operation on the grayscale image of the target object segmentation image and the grayscale image to be processed to highlight the board-writing data.

Further, in the example where the first pixel value and the pixel values of the first type of color board are both not greater than the grayscale threshold value, and the second pixel value and the pixel values of the second type of color board are both greater than the grayscale threshold value, if the color corresponding to the first pixel value is not black, an image multiplication can be performed on the grayscale image of the target object segmentation image and the grayscale image to be processed to highlight the board-writing data; If the color corresponding to the first pixel value is black and the color corresponding to the second pixel value is white, an image multiplication or an image AND operation can be performed on the grayscale image of the target object segmentation image and the grayscale image to be processed to highlight the board-writing data.

Herein, the image multiplication is to multiply pixel values of corresponding pixels in the grayscale image of the target object segmentation image by pixel values of corresponding pixels in the grayscale image to be processed. The first pixel value and the pixel values of the first type of color board are both not greater than the grayscale threshold value, and the second pixel value and the pixel values of the second type of color board are both greater than the grayscale threshold value, so in the practice where using a black pen to write a black character on the first type of color board and using a white pen to write a white character on the second type of color board, the pixel value products corresponding to the pixels of the board-writing data in the grayscale image to be processed is the largest in the multiplied result, and the pixels of the board-writing data in the grayscale image to be processed can be distinguished from other pixels comprising pixels of the writing board and pixels of the target object by reasonably selecting a third threshold value. Further, by a binarization processing, the grayscale values of pixels larger than the third threshold value are set to be 0, and the grayscale values of pixels not larger than the third threshold value are set to be 255, so that the board-writing image of said any image frame can be extracted, and the board-writing data in the extracted board-writing image is black.

If the color corresponding to the first pixel value in the target object segmentation image is black and the color corresponding to the second pixel value is white, the grayscale image of the target object segmentation image is the target object segmentation image. In this case, to perform an image AND operation on the grayscale image of the target object segmentation image and the grayscale image to be processed is to make pixels of the target object in the grayscale image to be processed become black pixels, and make pixel values of other pixels remain unchanged. Therefore, the pixel values corresponding to the pixels of the board-writing data in the grayscale image to be processed are the largest in the result of the image AND, and the pixels of the board-writing data in the grayscale image to be processed can be distinguished from other pixels comprising pixels of the writing board and pixels of the target object by reasonably selecting a fourth threshold value. Further, by a binarization processing, the grayscale values of pixels larger than the fourth threshold value are set to be 0, and the grayscale values of pixels no larger than the third fourth threshold value are set to be 255, so that the board-writing image of said any image frame can be extracted, and the board-writing data in the extracted board-writing image is also black.

Figure 5:
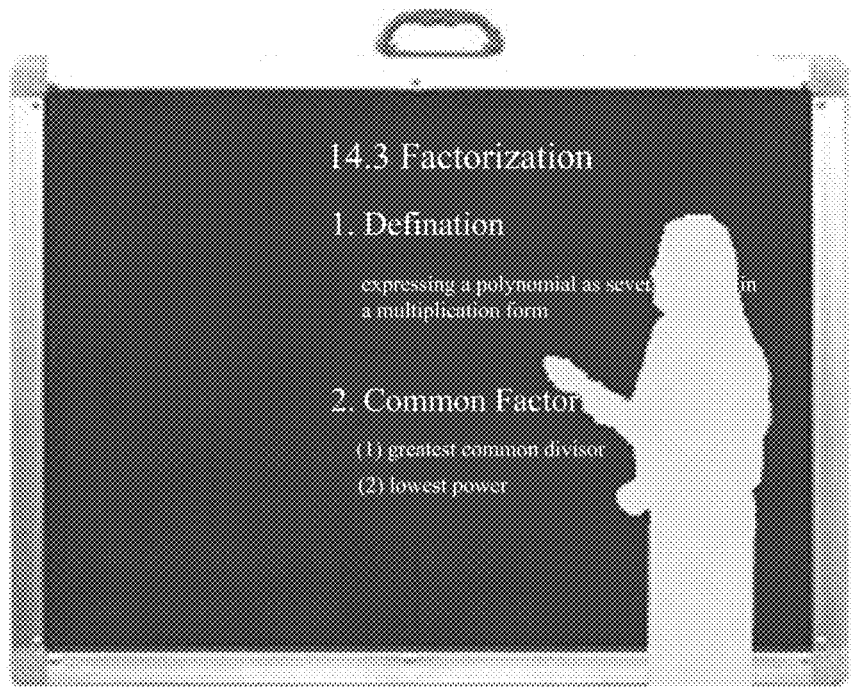
FIG. 5 shows an exemplary grayscale image of an image frame according to an embodiment of the present disclosure.
Figure 6A:
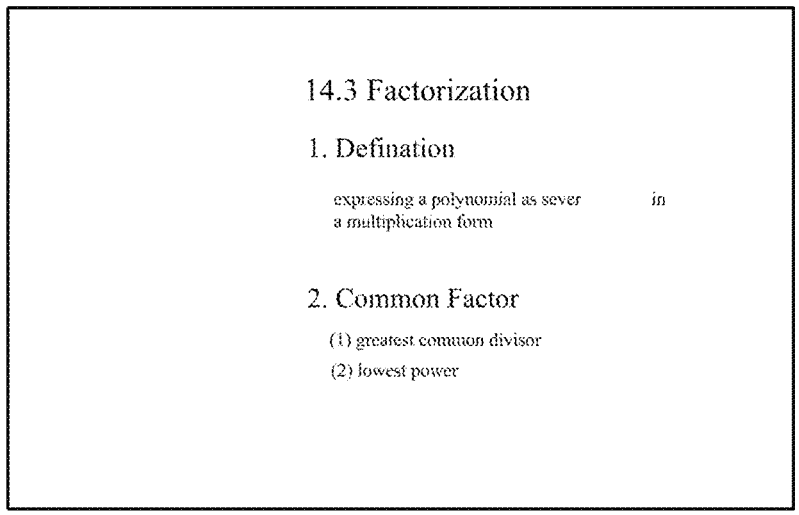
FIG. 6A and FIG. 6B respectively show an exemplary first board-writing image and second board-writing image according to an embodiment of the present disclosure.

Taking the target segmentation image shown in FIG. 4B and the grayscale image to be processed shown in FIG. 5 as an example, the obtained board-writing image is shown in FIG. 6A. Similarly, it should be noted that a black frame in FIG. 6A is an additional part added to identify the range of the board-writing image of current frame, but not a part of the board-writing image of the current frame.

In addition, in the example where the first pixel value and the pixel values of the first type of color board are both greater than the grayscale threshold value, and the second pixel value and the pixel values of the second type of color board are both not greater than the grayscale threshold value, the image multiplication can be performed on the grayscale image of the target object segmentation image and the grayscale image to be processed to highlight the board-writing data. In this case, the pixel value products corresponding to the pixels of the board-writing data in the grayscale image to be processed is the smallest in the multiplied result. And the pixels of the board-writing data in the grayscale image to be processed can be distinguished from other pixels comprising pixels of the writing board and pixels of the target object by reasonably selecting a fifth threshold value. Further, by a binarization processing, the grayscale values of pixels less than the fifth threshold value are set to be 0, and the grayscale values of pixels not less than the fifth threshold value are set to be 255, so that the board-writing image of said any image frame can be extracted, and the board-writing data in the extracted board-writing image is black.

In an optional embodiment, the extraction unit 110 is also used to perform an edge smoothing and enhancement processing after step S113 on a character in the image obtained by performing the binarization processing, and the image obtained after performing the edge smoothing and enhancement processing is used as a final board-writing image extracted by the extraction unit 110. To perform the edge smoothing and enhancement processing is to make a line thickness of a character to be uniform as far as possible and strokes of the character to be black. The edge smoothing and enhancement processing makes lines of various characters in the board writing content to be thicker and clearer, so as to avoid the unclear board writing content due to incorrect chalk writing on a black board, a green board or others.

Figure 7:
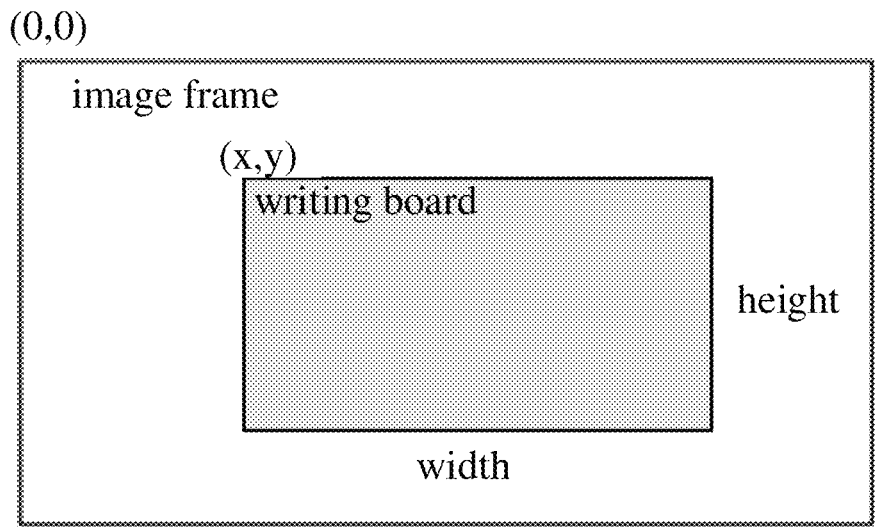
FIG. 7 shows an exemplary image frame according to an embodiment of the present disclosure.

The main purpose of the steps S111 to S113 is to extract the board-writing data, so it is only necessary to pay attention to an area of the writing board. However, in some videos, the image frame as shown in FIG. 7 is divided into an area of the writing board shown in gray and a peripheral area around the writing board shown in white. In this case, in order to avoid unnecessary processing, the extraction unit 110 is also used to crop the area of the writing board from said any image frame before step S111, that is, the area shown in gray in FIG. 7 is cropped out. Accordingly, the step S111 is to obtain a target object segmentation image of the area of the writing board, and the grayscale image of said any image frame involved in step S112 is a grayscale image of the area of the writing board.

In order to conveniently crop the area of the writing board from said any image frame, said any image frame can carry coordinate information of four vertices of the writing board in said any image frame, so the extraction unit 110 is configured to determine the area of the writing board in said any image frame based on the coordinate information and crop out the determined area of the writing board.

The coordinate information in said any image frame mentioned herein is actually position information of each vertex of the writing board in said any image frame, which can be represented in various ways. FIG. 7 shows a coordinate information in an image frame, that is, a coordinate of an upper left corner of the image frame is set to be (0, 0), the image frame is located in the first quadrant, and the coordinate information of four vertices of the writing board in the image frame is represented by a coordinate of an upper left corner of the writing board (x, y) and the width and height of the writing board. In other embodiments, the coordinate information of the four vertices of the writing board in the image frame can also be each represented by a corresponding coordinate in FIG. 7.

Specifically, the coordinate information of the four vertices of the writing board in said any image frame can be manually marked or automatically detected by a machine through the prior art. If the coordinate information is determined during a video recording process of a camera, the specific method may be to manually mark the coordinate information of the four vertices of the writing board using the camera, when the camera is installed. If the coordinate information is determined after shooting, the specific method may be that the area of the writing board is manually selected on a relevant software interface by an operator, and the coordinates of the vertices of the selected area are automatically read by the software as the above coordinate information. Since the position and shooting angle of the camera are fixed during the video recording process, the position of the writing board in said any image frame is fixed, so it is only necessary to calculate the coordinate information of the four vertices of the writing board in said any image frame through the first frame captured, and subsequent image frames will no longer participate in the calculation of the coordinate information of the four vertices of the writing board in said any image frame.

Figure 8:
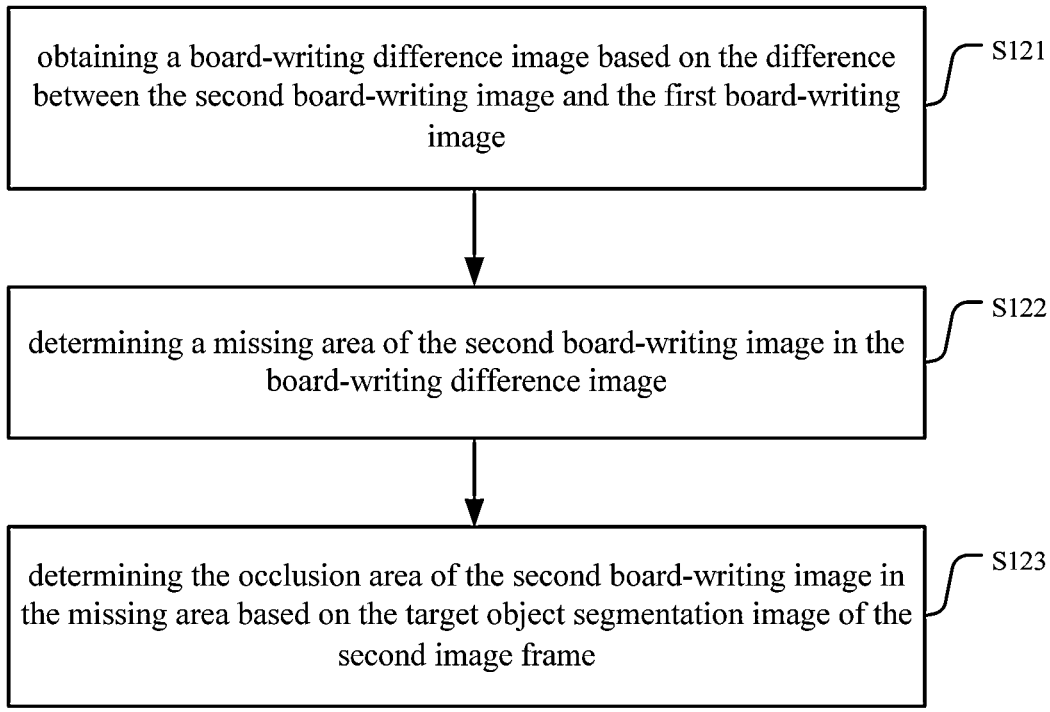
FIG. 8 shows a flowchart of a method performed by a supplement unit according to an embodiment of the present disclosure.

FIG. 8 shows a flowchart of the steps performed when the supplement unit 120 determine the occlusion area in the second board-writing image. Referring to FIG. 8, the supplement unit 120 is configured to perform the following steps to determine the occlusion area of the second board-writing image, and the following steps comprise:

Step S121, obtaining a board-writing difference image based on the difference between the second board-writing image and the first board-writing image.

Step S122, determining a missing area of the second board-writing image in the board-writing difference image.

Specifically, the board-writing difference image may include both an additional part of the second board-writing image relative to the first board-writing image and a missing part of the second board-writing image relative to the first board-writing image. This step is mainly to determine the missing part of the second board image relative to the first board image from the board-writing difference image, and the missing part is the missing area.

Step S123, determining the occlusion area of the second board-writing image in the missing area based on the target object segmentation image of the second image frame.

Figure 6B:
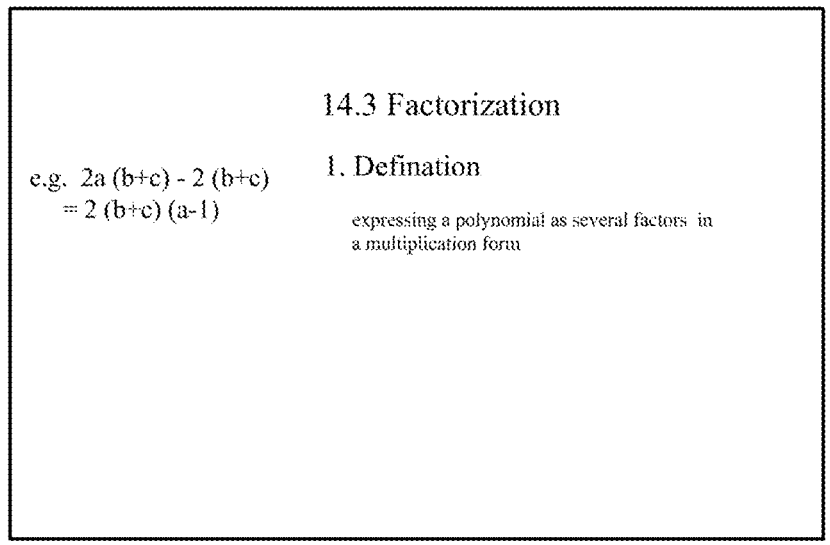
Figure 6C:
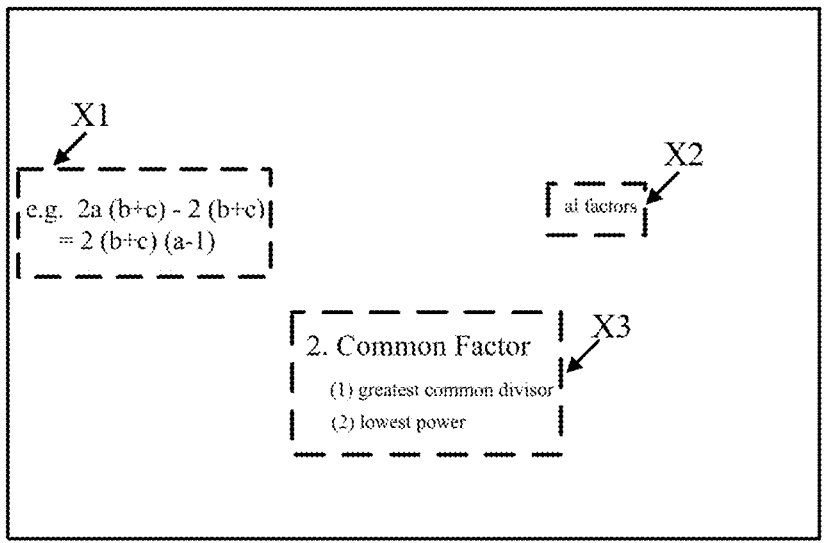
FIG. 6C shows a board-writing difference image obtained based on FIG. 6A and FIG. 6B according to an embodiment of the present disclosure.
Figure 6D:
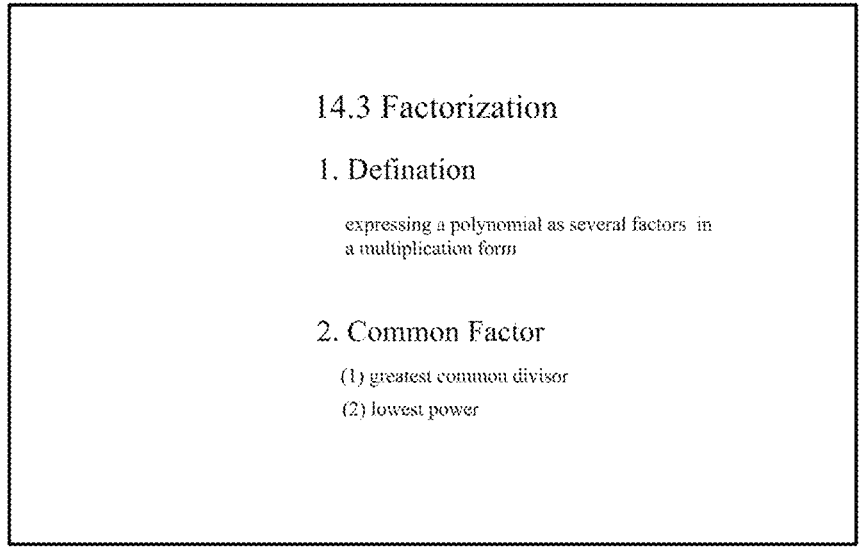
FIG. 6D shows a board-writing image obtained after that an image frame corresponding to FIG. 6A is supplemented according to an embodiment of the present disclosure.

For example, if the second board-writing image is as shown in FIG. 6A and the first board-writing image is as shown in FIG. 6B, the board-writing difference image of step S121 is as shown in FIG. 6C. Since the area X1 and the area X2 in FIG. 6C are not found in the second board-writing image, the area X1 and the area X2 in FIG. 6C are missing areas of the second board-writing image determined in step S122. To perform step S123 is to determine the area X2 in the missing areas of the second board-writing image as the occlusion area according to the target object segmentation image shown in FIG. 4B. Then, the supplement unit 120 replaces the occlusion area of the second board-writing image with a corresponding area of the first board-writing image to obtain the third board-writing image as shown in FIG. 6D. It should be noted that, in order to understand more clearly, there are board-writing data in the area X1, the area X2 and the area X3 in the board-writing difference image shown in FIG. 6C. In fact, the board-writing difference image determined in step S121 only needs to be able to determine the location of an area with difference, and step S122 used for determining the missing area only needs to be able to determine the location of the missing area.

Figure 9:
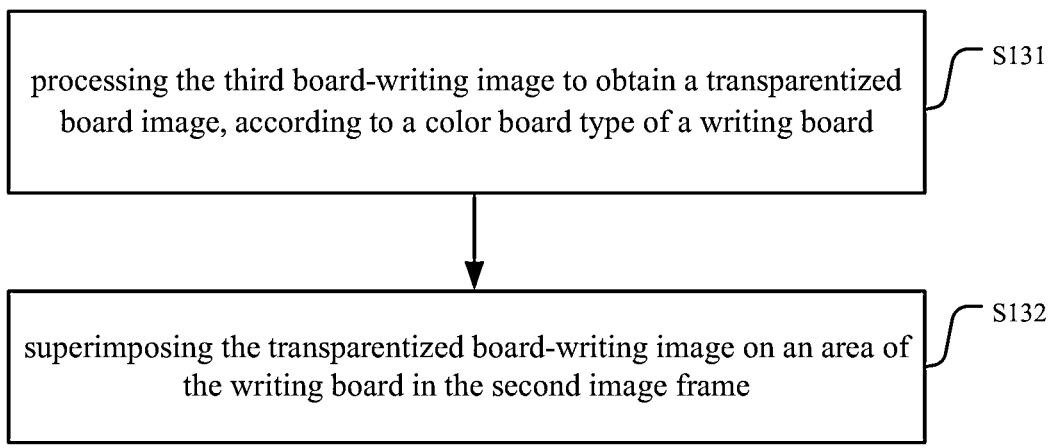
FIG. 9 shows a flowchart of a method performed by an output unit according to an embodiment of the present disclosure.

FIG. 9 shows a flowchart of the steps performed when the output unit 130 generates the output image frame. Referring to FIG. 9, the output unit 130 is configured to perform the following steps to generate the output image frame, and the following steps comprise:

Step S131, processing the third board-writing image to obtain a transparentized board image, according to a color board type of a writing board.

Step S132, superimposing the transparentized board-writing image on an area of the writing board in the second image frame.

Specifically, in an embodiment, the transparentized board-writing image can be an image obtained by performing an image inversion operation on the third board-writing image and then performing a transparentized processing, when the writing board is the first type of color board; the transparentized board-writing image can be an image obtained by performing a transparentized processing on the third board-writing image, when the writing board is the second type of color board. A transparency degree of the transparentized board-writing image can be set by changing transparency parameters. Wherein, the pixel values of the grayscale image of the first type of color board are close to the pixel values of the board-writing data in the grayscale image of the third board-writing image, and the pixel values of the grayscale image of the second type of color board are close to the pixel values of the background in the grayscale image of the third board-writing image.

Further, if the board-writing data in the third board-writing image has a third pixel value and the background has a fourth pixel value, in an embodiment, the pixel values of the first type of color board and the third pixel value can both be less than the grayscale threshold value, and the pixel values of the second type of color board and the fourth pixel value are both greater than the grayscale threshold value; or, the pixel values of the first type of color board and the third pixel value are both greater than the grayscale threshold value, and the pixel values of the second type of color board and the fourth pixel value can both be less than the grayscale threshold value.

For example, in the third board-writing image, if the board-writing data is black and the background is white, the first type of color board is a dark color board, and the second type of color board is a light color board. In this example, when the writing board is a dark color board, the transparentized board-writing image is an image obtained by performing an image inversion operation on the third board-writing image and then performing a transparentized processing; When the writing board is a light color board, the transparentized board-writing image is an image obtained by performing a transparentized processing on the third board-writing image.

It should be noted that, it is required to ensure that the second image frame is not damaged when the second board-writing image is extracted from the second image frame in the video by the extraction unit S110, so in the present embodiment, it is only necessary to superimpose the transparentized board-writing image on the area of the writing board in the second image frame.

In the embodiments of the present disclosure, the transparentized board-writing image is superimposed on the area of the writing board in the second image frame, which makes the generated output image frame to present a "virtual reality" enhancement image with the target object located behind the transparentized board writing content, so as to not only ensure that the user can view the complete board writing content, but also enable the user to see the movement of the target object which brings a better understand on the board writing content based on the movement of the target object.

Figure 10:
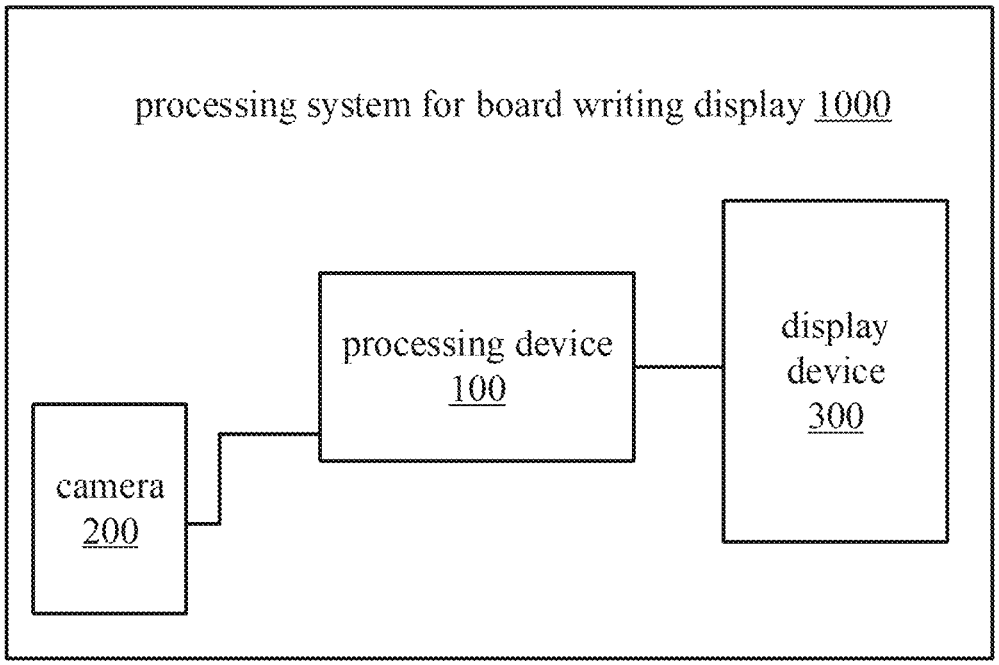
FIG. 10 shows a structural block view of a processing system for board writing display according to an embodiment of the present disclosure.

Corresponding to the above processing device 100, a processing system for board writing display is also provided in the embodiments of the present disclosure. As shown in FIG. 10, the processing system 1000 includes a camera 200, any one processing device 100 as described above, and a display device 300. The camera 200 is configured to obtain a video. The any one processing device 100 as described above is electrically connected to the camera 200 and configured to process the video. The display device 300 is electrically connected to the processing device 100 and configured to display the processed video. Specifically, in the processing system 1000, the processing device 100, the camera 200, and the display device 300 can be integrated in one device, or they can be independent devices, which is not limited in the embodiments of the present disclosure. Since the processing system 1000 includes the above-described processing device 100, the board-writing data in the processed video displayed by the display device 300 is completely presented in front of the target object.

Figure 11:
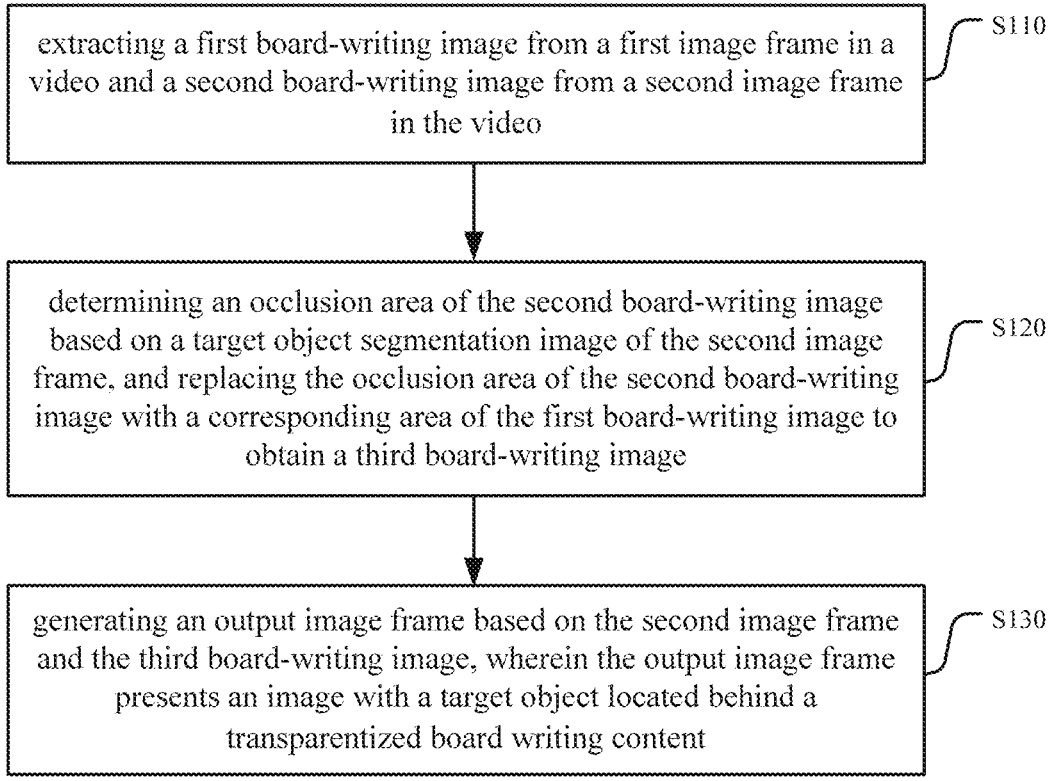
FIG. 11 shows a flowchart of a processing method for board writing display according to an embodiment of the present disclosure.

Corresponding to the above processing device 100, a processing method for board writing display is also provided in the embodiments of the present disclosure. As shown in FIG. 11, the processing method includes:

Step S110, extracting a first board-writing image from a first image frame in a video and a second board-writing image from a second image frame in the video.

Step S120, determining an occlusion area of the second board-writing image based on a target object segmentation image of the second image frame, and replacing the occlusion area of the second board-writing image with a corresponding area of the first board-writing image to obtain a third board-writing image.

Step S130, generating an output image frame based on the second image frame and the third board-writing image, wherein the output image frame presents an image with a target object located behind a transparentized board writing content.

Since this processing method is executed by the above processing device 100 and can achieve the same technical effects, the specific details can be found in the previous embodiments, which will not be repeated herein.

It should be noted that the description of each embodiment in the present disclosure focuses on the differences with other embodiments, and the same or similar parts of each embodiment can be understood by mutual reference. For the system embodiment, since it is basically similar to the method embodiment, the relevant points can refer to the description of the method embodiment.

In addition, it should be noted that in the device and method in the present disclosure, it is obvious that each component or step can be disassembled and/or reassembled. Each disassembly and/or reassembly shall be considered as an equivalent scheme of the present disclosure. In addition, the steps of executing the above series of processing can be executed in chronological order naturally according to the described order, but is not necessary to be executed in chronological order. Some steps can be executed in parallel or independently of each other. For those skilled in the art, they can understand that all or any steps or components of the method and device in the present disclosure can be implemented in way of hardware, firmware, software, or their combinations in any computing device (including processor, storage medium, etc.) or a network of computing devices, which can be achieved by those skilled in the art using their basic programming skills after reading the description of the present disclosure.

Finally, it should be noted that, obviously, the above embodiments are only examples to clearly illustrate the present disclosure, and are not intended to limit the implementation manner. For those skilled in the art, other changes or modifications in different forms can be made on the basis of the above description. It is unnecessary and impossible to exhaustively enumerate all embodiments herein. The obvious changes or modifications derived from this are still within the protection scope of the present disclosure.

What is claimed is:

1. A processing device for board writing display, wherein the processing device comprises:
   an extraction unit, configured to extract a first board-writing image from a first image frame in a video and a second board-writing image from a second image frame in the video;
   a supplement unit, configured to determine an occlusion area of the second board-writing image based on a target object segmentation image of the second image frame, and replace the occlusion area of the second board-writing image with a corresponding area of the first board-writing image to obtain a third board-writing image;
   an output unit, configured to generate an output image frame based on the second image frame and the third board-writing image, wherein the output image frame presents an image with a target object located behind a transparentized board writing content;
   wherein, the first board-writing image is a board-writing image with complete board-writing data, and the second board-writing image is a board-writing image that needs to be supplemented with board-writing data due to the target object being occluded.

2. The processing device according to claim 1, wherein the extraction unit is configured to extract a board-writing image of any image frame in the video by performing following steps, comprising:
   obtaining a target object segmentation image of said any image frame, wherein a contrast ratio between a target object and a background in the target object segmentation image of said any image frame reaches a predetermined contrast ratio;
   obtaining a grayscale image to be processed based on a grayscale image of said any image frame, according to a color board type of a writing board;
   performing an image operation on the target object segmentation image of said any image frame and the grayscale image to be processed to highlight board-writing data, and performing a binarization processing on an image obtained by performing the image operation to obtain the board-writing image of said any image frame.

3. The processing device according to claim 2, wherein the extraction unit is configured to obtain the target object segmentation image of said any image frame by obtaining a matte image or a mask-code image of the target object in said any image frame.

4. The processing device according to claim 2, wherein the extraction unit is further configured to determine the color board type of the writing board based on a pixel value distribution of the grayscale image of said any image frame in the video.

5. The processing device according to claim 2, wherein the extraction unit is further configured to perform an edge smoothing and enhancement processing on a character in the image obtained by performing the binarization processing, and to determine the image obtained after performing the edge smoothing and enhancement processing as the board-writing image of said any image frame.

6. The processing device according to claim 2, wherein said any image frame is divided into an area of the writing board and a peripheral area around the writing board;
   the extraction unit is further configured to crop the area of the writing board from said any image frame, obtain a target object segmentation image of the area of the writing board as the target object segmentation image of said any image frame, and obtain a grayscale image of the area of the writing board as the grayscale image of said any image frame which is a basis for obtaining the grayscale image to be processed.

7. The processing device according to claim 6, wherein said any image frame has coordinate information of four vertices of the writing board in said any image frame, the extraction unit is further configured to crop the area of the writing board from said any image frame by performing following steps, comprising:
   determining the area of the writing board in said any image frame based on the coordinate information, and cropping out the determined area of the writing board.

8. The processing device according to claim 1, wherein the output unit is configured to generate the output image frame by performing following steps, comprising:
   processing the third board-writing image to obtain a transparentized board image, according to a color board type of a writing board;
   superimposing the transparentized board-writing image on an area of the writing board in the second image frame.

9. The processing device according to claim 1, wherein the supplement unit is configured to determine the occlusion area of the second board-writing image by performing following steps, comprising:
   obtaining a board-writing difference image based on the difference between the second board-writing image and the first board-writing image;
   determining a missing area of the second board-writing image in the board-writing difference image;

determining the occlusion area of the second board-writing image in the missing area based on the target object segmentation image of the second image frame.

10. A processing system for board writing display, wherein the processing system comprises:
a camera, configured to obtain a video;
the processing device according to claim 1 which is electrically connected to the camera and configured to process the video;
a display device, electrically connected to the processing device and configured to display the processed video.

11. A processing method for board writing display, wherein the processing method comprises:
extracting a first board-writing image from a first image frame in a video and a second board-writing image from a second image frame in the video;
determining an occlusion area of the second board-writing image based on a target object segmentation image of the second image frame, and replacing the occlusion area of the second board-writing image with a corresponding area of the first board-writing image to obtain a third board-writing image;
generating an output image frame based on the second image frame and the third board-writing image, wherein the output image frame presents an image with a target object located behind a transparentized board writing content;
wherein, the first board-writing image is a board-writing image with complete board-writing data, and the second board-writing image is a board-writing image that needs to be supplemented with board-writing data due to the target object being occluded.

* * * * *